(12) United States Patent
Springer et al.

(10) Patent No.: US 7,163,095 B2
(45) Date of Patent: Jan. 16, 2007

(54) CLUTCH ASSEMBLY WITH VIBRATION DAMPER

(75) Inventors: James A. Springer, Ann Arbor, MI (US); Robert S. Samanich, Brighton, MI (US); Raymond J. Haka, Brighton, MI (US); Joel M. Maguire, Northville, MI (US); Peter E. Devlin, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 127 days.

(21) Appl. No.: 10/952,022

(22) Filed: Sep. 28, 2004

(65) Prior Publication Data

US 2005/0183922 A1    Aug. 25, 2005

Related U.S. Application Data

(60) Provisional application No. 60/546,144, filed on Feb. 20, 2004.

(51) Int. Cl.
*F16D 25/0638* (2006.01)
*F16D 13/74* (2006.01)
*F16F 15/10* (2006.01)

(52) U.S. Cl. .............. 192/70.12; 192/30 V; 192/113.34
(58) Field of Classification Search ...................... None
See application file for complete search history.

(56) References Cited

U.S. PATENT DOCUMENTS

| | | | |
|---|---|---|---|
| 1,136,839 A | 4/1915 | Seidel | |
| 1,813,820 A | 7/1931 | Ross | |
| 2,267,311 A | 12/1941 | Smith | |
| 2,704,467 A * | 3/1955 | Spase | ........................ 192/30 V |
| 3,187,604 A | 6/1965 | Hazel | |
| 3,357,519 A | 12/1967 | Anderson et al. | |
| 4,068,749 A * | 1/1978 | Antrim | ........................ 192/207 |
| 4,254,985 A | 3/1981 | Kirschner | |
| 4,317,388 A | 3/1982 | Wojcikowski | |
| 4,458,793 A * | 7/1984 | Riese et al. | ............... 192/70.12 |
| 4,842,116 A * | 6/1989 | Fukushima | ................ 192/30 V |
| 4,848,185 A | 7/1989 | Moltner et al. | |
| 5,386,894 A | 2/1995 | Barca | |
| 5,560,267 A | 10/1996 | Todd et al. | |
| 5,579,665 A | 12/1996 | Mott et al. | |
| 5,655,416 A | 8/1997 | Mott et al. | |
| 5,788,037 A * | 8/1998 | Forsyth et al. | ............ 192/70.12 |
| 6,068,098 A * | 5/2000 | Yamamoto | ................. 192/30 V |

(Continued)

FOREIGN PATENT DOCUMENTS

DE    1171274 B    5/1964

(Continued)

*Primary Examiner*—Rodney H. Bonck
(74) *Attorney, Agent, or Firm*—Dan L. Thompson

(57) ABSTRACT

A clutch assembly includes a hub with a hub friction surface and an inner surface that cooperate to define a cavity. A damper member is situated within the cavity and is in contact with the hub friction surface. The damper member is rotatable with respect to the hub so that relative movement between the damper ring and the hub friction surface results in energy absorption and dissipation to minimize unwanted clutch vibration. The damper ring is located inside the clutch hub so that it does not adversely affect transmission packaging. The clutch assembly preferably includes a member configured to direct lubricant along an inner diameter of the damper member so that it subsequently flows between the damper ring and the hub friction surface and through holes in the hub to lubricate clutch plates.

10 Claims, 4 Drawing Sheets

U.S. PATENT DOCUMENTS

| | | | |
|---|---|---|---|
| 2001/0032769 A1* | 10/2001 | Lehmann et al. | 192/55.1 |
| 2002/0046916 A1* | 4/2002 | Peinemann et al. | 192/70.17 |
| 2002/0049090 A1* | 4/2002 | Peinemann et al. | 464/68 |
| 2005/0107198 A1 | 5/2005 | Sowul et al. | |

FOREIGN PATENT DOCUMENTS

DE    19536424 C2    12/1997

* cited by examiner

CLUTCH ASSEMBLY WITH VIBRATION DAMPER

CROSS REFERENCE TO RELATED APPLICATION

This application claims the benefit of U.S. Ser. No. 60/546,144, filed Feb. 20, 2004, and which is hereby incorporated by reference in its entirety.

TECHNICAL FIELD

This invention relates to clutch assemblies having dampers integrally located within a clutch hub to reduce self-excitation of the clutch assembly during clutch engagement or disengagement.

BACKGROUND OF THE INVENTION

In general, a motor vehicle automatic transmission includes a number of gear elements and selectively engageable friction elements (referred to herein as clutches) that are controlled to establish one of several forward speed ratios between the transmission input and output shafts. The input shaft is typically coupled to the vehicle engine through a fluid coupling such as a torque converter, and the output shaft is coupled to the vehicle drive wheels through a differential gear set.

Shifting from a currently established speed ratio to a new speed ratio involves, in most cases, disengaging a clutch (off-going clutch) associated with the current speed ratio and engaging a clutch (on-coming clutch) associated with the new speed ratio. Engagement and disengagement of a clutch may result in self-excitation of the clutch as the clutch slips.

SUMMARY OF THE INVENTION

A clutch assembly is provided that eliminates or reduces audible noise that may be generated by clutch self-excitation during engagement or disengagement. The clutch assembly includes a clutch hub rotatable about an axis. The hub has an inner surface and a hub friction surface. The inner surface and the hub friction surface cooperate to at least partially define a cavity. A damper (also sometimes referred to as a "dampener") member is located within the cavity and is in contact with the hub friction surface. The damper member is rotatable with respect to the clutch hub about the axis so that relative movement between the damper member and the hub friction surface results in energy absorption and dissipation to minimize unwanted clutch vibration. The damper ring prevents or reduces oscillation and self-excitation of the clutch assembly, as opposed to prior art dampers which absorb external excitation sources, such as firing pulses from an engine. Since the damper member is located within a cavity in the hub, it does not have an adverse effect on transmission packaging. Prior art damper members, such as those used on engines, are "added on" to an existing system and require additional packaging space.

Preferably, the clutch assembly is configured such that the cavity is in fluid communication with a source of fluid lubricant, and is configured so that fluid lubricant flows between the damper member and the hub friction surface to the inner surface. Holes formed in the hub through the inner surface provide a passageway for the fluid to flow to clutch plates.

The above features and advantages, and other features and advantages, of the present invention are readily apparent from the following detailed description of the best mode for carrying out the invention when taken in connection with the accompanying drawings.

DESCRIPTION OF THE PREFERRED EMBODIMENT

Figure 1:
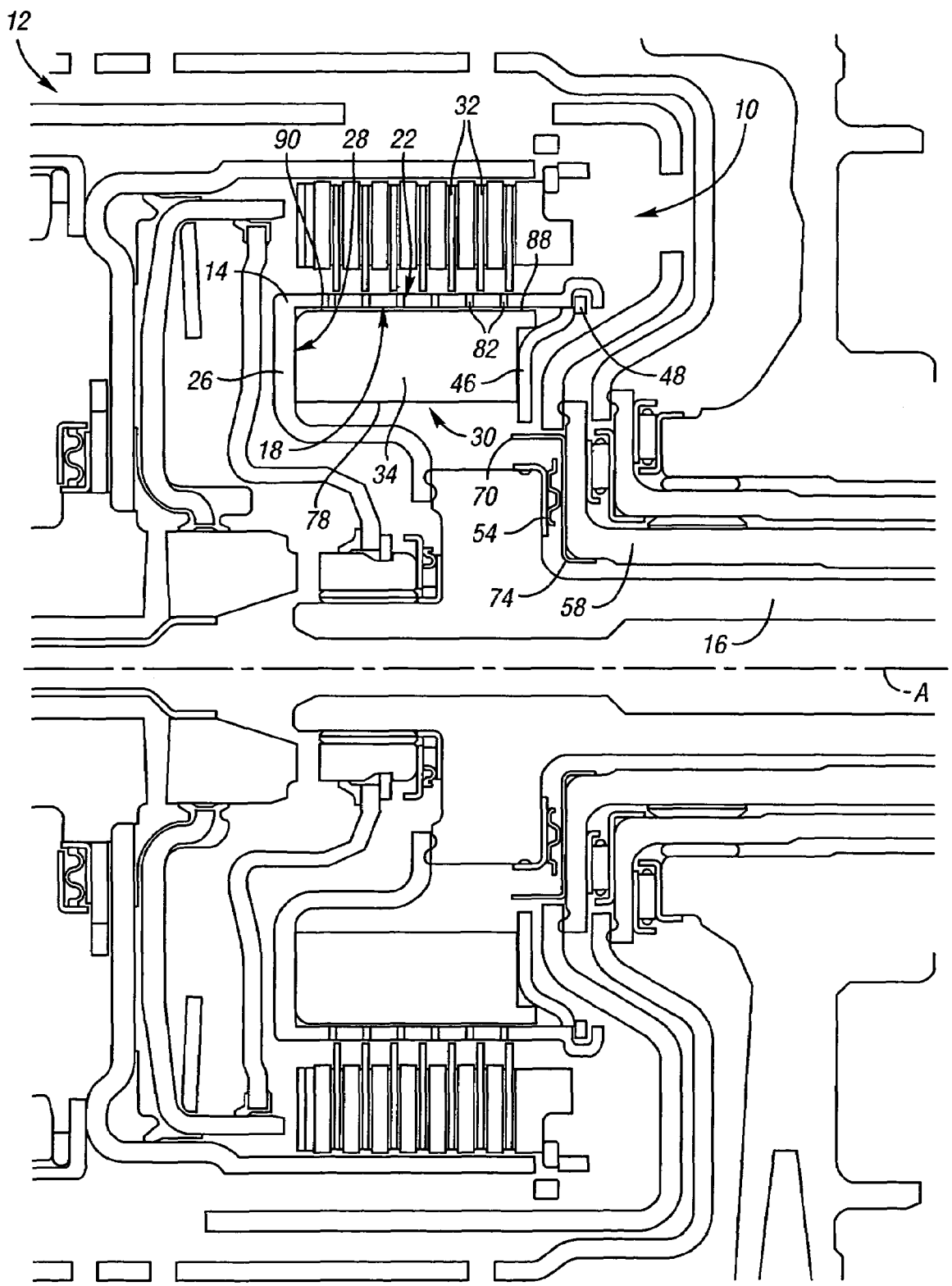
FIG. 1 is a schematic cross section of a clutch assembly with a damper ring in an automatic transmission.

Referring to FIG. 1, a clutch assembly 10 in a vehicle automatic transmission 12 is schematically depicted. The clutch assembly 10 includes a clutch hub 14 rotatable about axis A on hub shaft 16. The clutch hub 14 is characterized by an inner surface 18 that is oriented generally axially, i.e., parallel to axis A, and an outer surface 22 opposite the inner surface 18. The clutch hub 14 includes a wall 26 that defines hub friction surface 28. The wall 26 and the hub friction surface 28 are generally radially oriented, i.e., perpendicular to axis A. A plurality of clutch plates 32 are operatively connected to the hub 14 for rotation therewith at the outer surface 22. The inner surface 18 and the outer surface 22 may be splined.

The hub friction surface 28 and the inner surface 18 partially define an annular cavity 30 in the embodiment depicted. An annular damper member, or damper ring 34, is in the cavity 30. The damper ring 34 and the cavity 30 are situated in the hub 14 between the plates 32 and the axis of rotation A so that the damper ring 34 does not affect transmission packaging.

Figure 3:
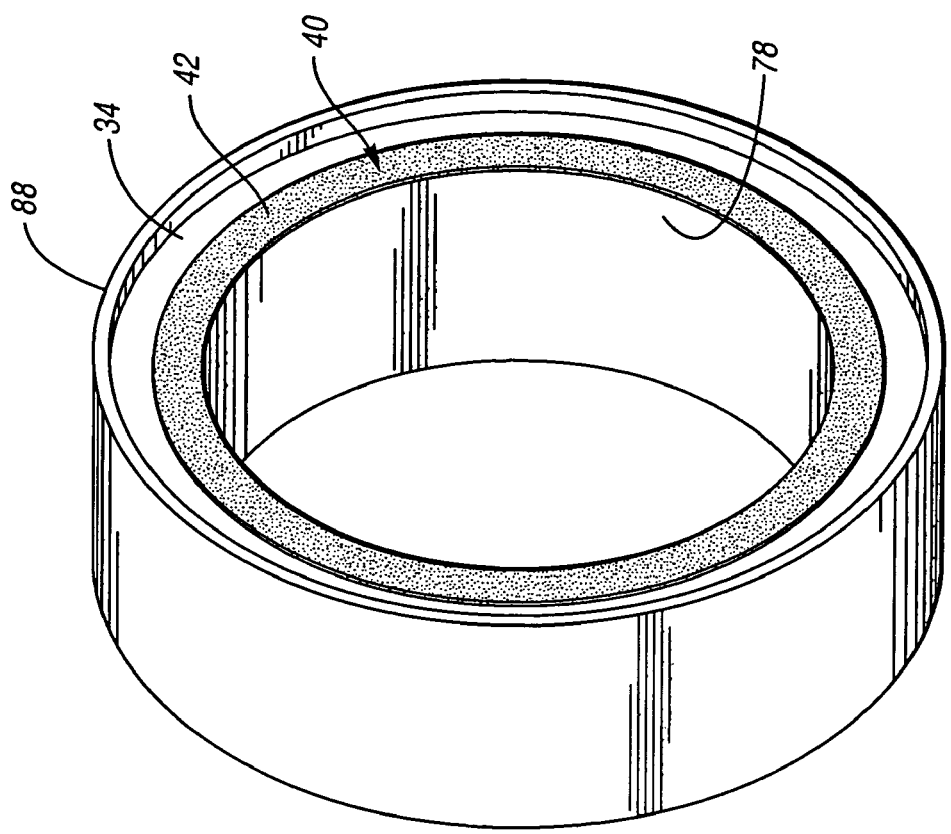
FIG. 3 is another schematic perspective view of the damper ring of FIGS. 1 and 2.
Figure 2:
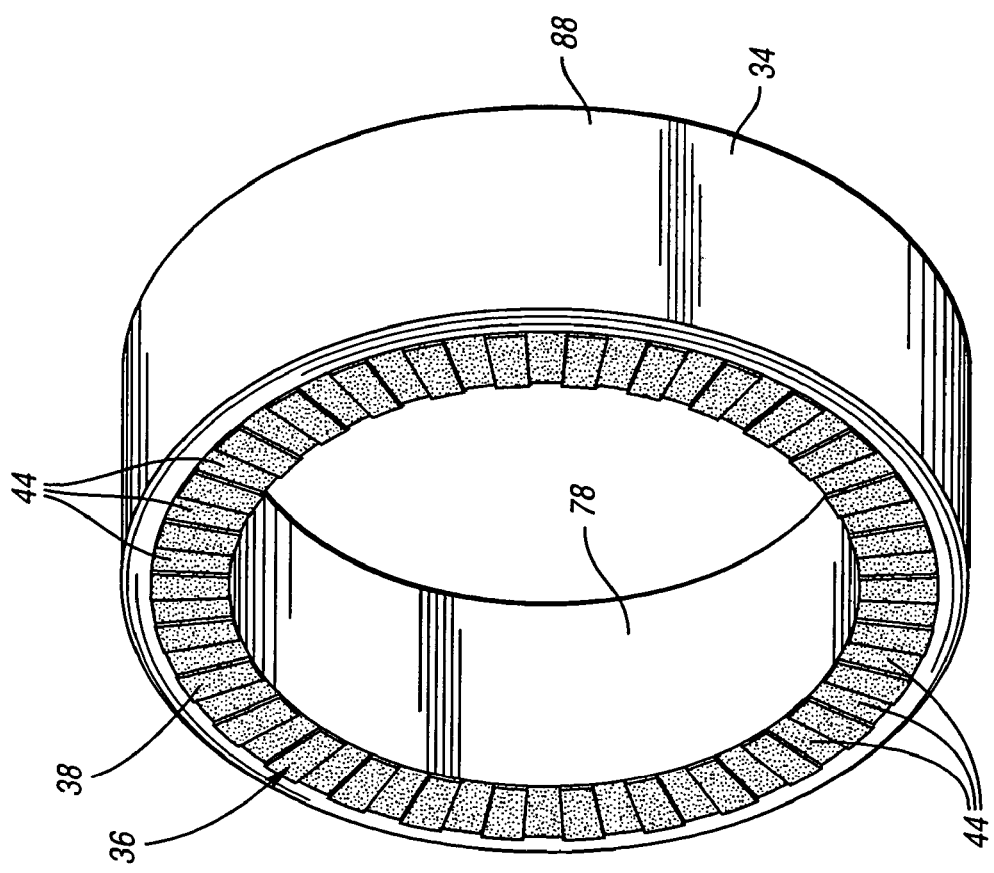
FIG. 2 is a schematic perspective view of the damper ring of FIG. 1.

Referring to FIGS. 2 and 3, wherein like reference numbers refer to like components from FIG. 1, the damper ring 34 is composed of powdered metal to maximize rotational inertia at a reasonable cost. The damper ring 34 has an annular first damper friction surface 36 formed by a first friction disk 38 bonded to one side of the ring 34, and an annular second damper friction surface 40 formed by a second friction disk 42 bonded to an opposite side of the ring 34. The friction disks 38, 42 are preferably a friction-enhancing material such as friction paper. The first friction disk 38 is interrupted by a plurality of radial grooves 44 or slots.

Figure 4:
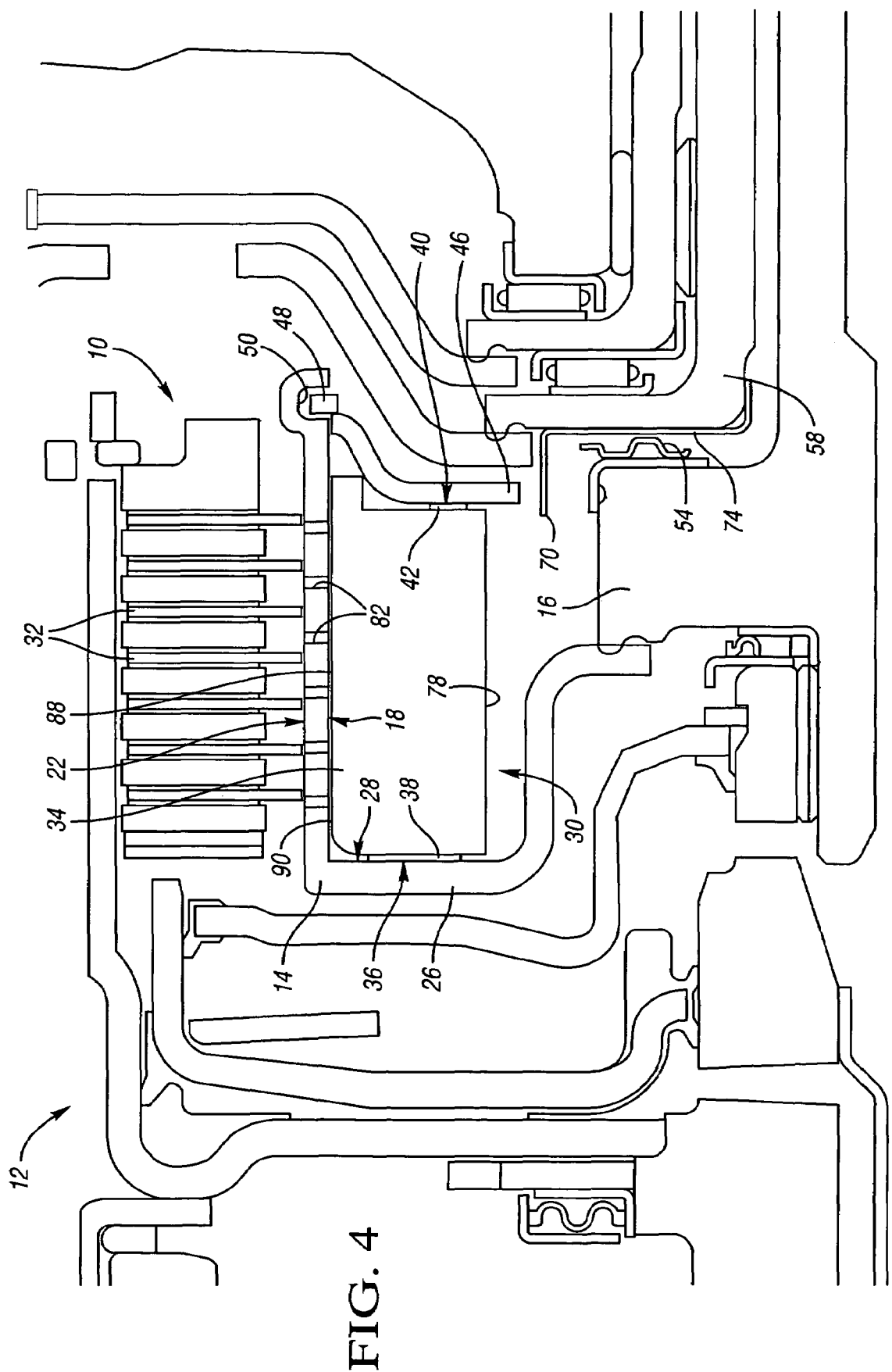
FIG. 4 is a schematic cross section of a portion of the clutch assembly of FIG. 1.

Referring to FIG. 4, wherein like reference numbers refer to like components from FIGS. 1–3, the first friction disk 38 (shown exaggerated in size) is in contact with the hub friction surface 28. A damper apply member, i.e., apply plate 46, exerts an axial force on the second friction disk 42 (shown exaggerated in size) to retain the damper ring 34 in the cavity 30 and to maintain contact between the first damper friction surface 36 and the hub friction surface 28. The damper apply plate 46 is elastically (i.e., nonrigidly so as to create a spring constant) grounded to the hub 14 by a wavy snap ring 48 inserted into an annular groove 50 in the hub 14.

The damper ring 34 is rotatable about axis A, and is rotatable with respect to the clutch hub 14. Relative movement between the hub friction surface 28 and the first friction disk 38 results in energy absorption and dissipation to minimize unwanted clutch vibration so as to reduce or eliminate noise caused by clutch self-excitation. Relative movement between the apply plate 46 and the second friction disk 42 similarly results in energy absorption and dissipation.

Those skilled in the art will recognize that such energy absorption characteristics are a function of the moment of inertia of the damper ring 34, the coefficient of friction between the hub friction surface 28, the apply plate 46, and the friction disks 38, 42, respectively, the effective radii of the friction elements, the number of active friction surfaces, and the axial force exerted by the apply plate 46 on the damper ring 34. More specifically, the energy absorption of the damper is a function of the acceleration of the clutch hub, the moment of inertia of the damper ring, and the "breakaway" torque (the product of the coefficient of friction, the number of active surfaces, the effective radius, and the axial force).

The optimum energy dissipation occurs when the breakaway torque is adjusted so the inertia ring slips about half the time. Energy dissipated is the product of the break-away torque and angular displacement. At zero breakaway torque the angular displacement is large, but the product of the two is zero. At very high break away torque values, the angular displacement will be zero because relative movement between the hub 14 and the ring 34 is prevented, and the dissipated energy is again zero. There is thus an optimum break-away torque value that maximizes energy dissipation. This optimum value is a function of the moment of inertia of the damper ring and the acceleration of the hub (displacement multiplied by the squared frequency).

Figure 5:
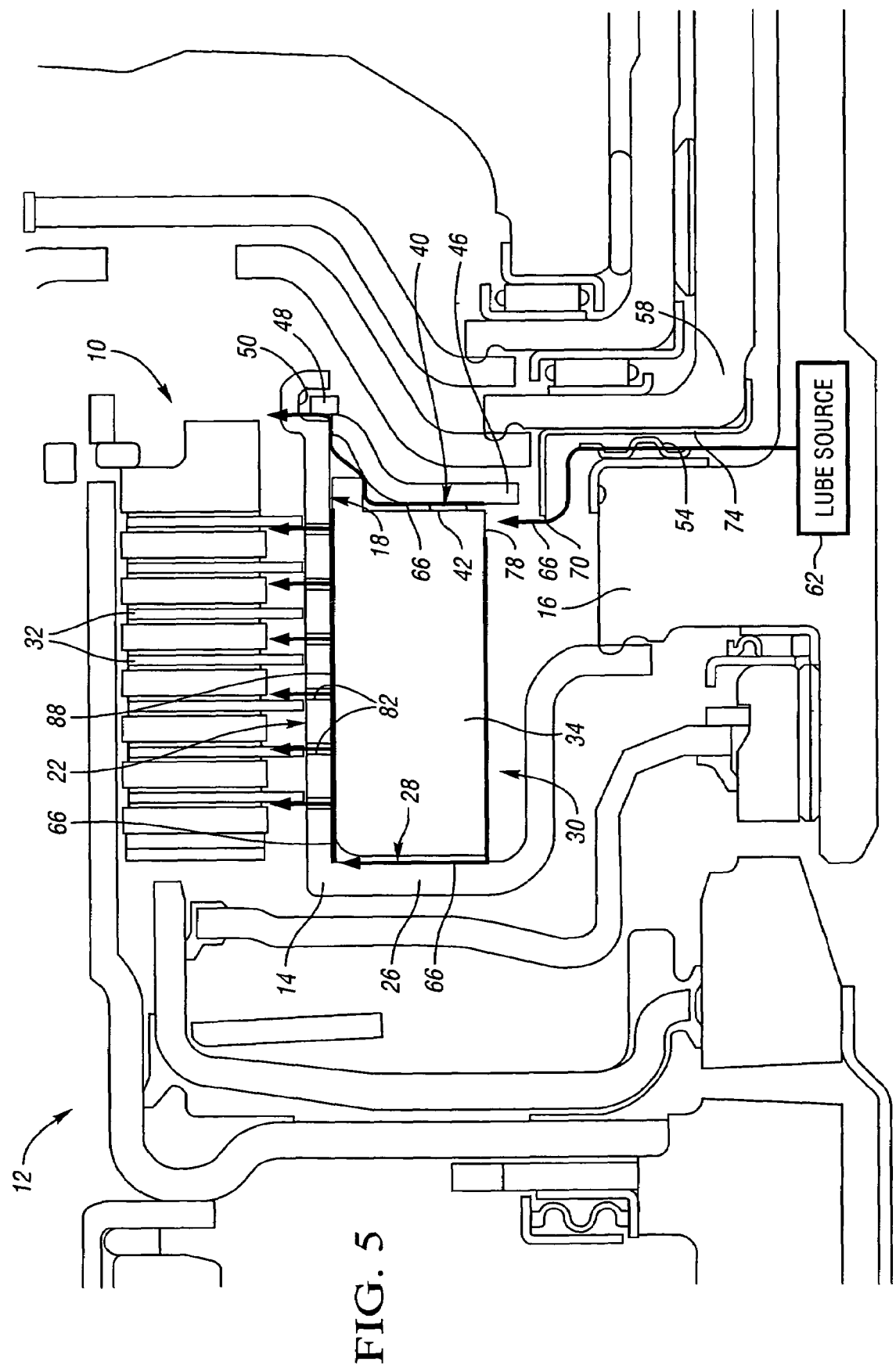
FIG. 5 is a schematic cross section of the portion of the clutch assembly of FIG. 4, with arrows to indicate fluid flow paths through the clutch assembly and, more particularly, around the damper ring.

Referring to FIG. 5, wherein like reference numbers refer to like components from FIGS. 1–4, the transmission 12 includes a thrust bearing 54 between two shafts 16, 58. The thrust bearing 54 is in fluid communication with a pressurized fluid source 62, such as a pump, for lubrication and cooling of the thrust bearing 54. The clutch assembly 10 is configured and positioned to receive fluid lubricant 66 from the fluid source 62 via the thrust bearing 54.

The apply plate 46 is positioned with respect to the lubrication exit 70 of the thrust bearing race 74 to divert or guide fluid 66 exiting the bearing race 74 to flow along or around the damper ring 34. A small amount of fluid 66 will flow between the second friction disk 42 and the apply plate 46. Most of the fluid 66 will flow along the inner diameter 78 of the damper ring 34, then between the hub friction surface 28 and the damper ring 34 through the grooves formed in the first friction disk (not shown in FIG. 5) to lubricate and cool the first friction disk and the hub friction surface 28. Alternatively, and within the scope of the claimed invention, the hub friction surface 28 may be interrupted by a plurality of grooves to facilitate the flow of lubricant 66 between the damper ring 34 and the hub friction surface 28.

Holes 82 formed in the hub 14 extend from the inner surface 18 to the outer surface 22. The outer diameter 88 of the damper ring 34 and the inner surface 18 define an annular lubricant flowpath therebetween, shown at 90 in FIG. 4. After flowing through the grooves in the first friction disk, the lubricant 66 is admitted into flowpath 90, and then through the holes 82 to lubricate the plates 32.

While the best modes for carrying out the invention have been described in detail, those familiar with the art to which this invention relates will recognize various alternative designs and embodiments for practicing the invention within the scope of the appended claims.

The invention claimed is:

1. A clutch assembly comprising:
   a clutch hub rotatable about an axis, the clutch hub having a hub friction surface that at least partially defines a cavity;
   a damper member that is situated within the cavity, in contact with the hub friction surface to minimize vibration, and rotatable with respect to the clutch hub about the axis; and
   wherein the clutch assembly is configured such that the cavity is in fluid communication with a source of fluid lubricant, and wherein the clutch assembly is sufficiently configured to direct the lubricant between the damper member and the hub friction surface.

2. The clutch assembly of claim 1, wherein the damper member is a damper ring; wherein the clutch assembly further comprises an apply member grounded to the hub and sufficiently configured and positioned to exert an axial force on the damper ring; and wherein the apply member is sufficiently configured and positioned to direct or retain lubricant from the fluid source so that the lubricant flows axially along at least a portion of the inner diameter of the damper ring.

3. The clutch assembly of claim 1, wherein the damper member includes a damper friction surface in contact with the hub friction surface; and wherein one of the hub friction surface and the damper friction surface is interrupted by a plurality of grooves to facilitate the flow of lubricant between the damper member and the hub friction surface.

4. The clutch assembly of claim 1, further comprising:
   a plurality of clutch plates operatively connected to the hub for rotation therewith;
   wherein the hub is characterized by an inner surface that cooperates with the hub friction surface to define the cavity;
   wherein the hub is characterized by an outer surface opposite the inner surface;
   wherein the damper member is characterized by an outer diameter that cooperates with the inner surface of the clutch hub to define a lubricant flowpath therebetween;
   wherein the lubricant flowpath is sufficiently configured to admit lubricant from between the damper member and the hub friction surface; and
   wherein the hub defines a plurality of holes extending from the inner surface to the outer surface through which lubricant can flow from the lubricant flowpath to lubricate and cool the clutch plates.

5. The clutch assembly of claim 1, further comprising a plurality of clutch plates operatively connected to the hub for rotation therewith; and wherein the damper member is at least partially between at least one of said clutch plates and the axis.

6. A transmission comprising:
   a clutch hub rotatable about an axis, the clutch hub having an inner surface and a hub friction surface that cooperate to at least partially define a cavity;
   a damper ring that is situated within the cavity, in contact with the hub friction surface, and rotatable with respect to the clutch hub about the axis;
   two shafts; a bearing between the two shafts; and a source of pressurized fluid lubricant in fluid communication with the bearing;
   wherein the cavity is in fluid communication with the bearing to receive lubricant therefrom.

7. The transmission of claim 6, further comprising an apply member configured to exert an axial force on the damper ring, and sufficiently positioned and configured to divert or direct lubricant from the bearing along at least a portion of the inner diameter of the damper ring.

8. The transmission of claim 7, wherein the hub is characterized by an outer surface opposite the inner surface;
   wherein the outer diameter of the damper ring and the inner surface cooperate to form a lubricant flowpath;
   wherein the hub is characterized by at least one hole extending between the inner surface and the outer surface; and
   wherein the damper ring is configured such that at least a portion of the lubricant directed along at least a portion of the inner diameter of the damper ring subsequently flows between the damper ring and the hub friction surface, into the lubricant flowpath, and through the hole.

9. The transmission of claim 8, further comprising a plurality of clutch plates operatively connected to the hub for rotation therewith and in fluid communication with the hole.

10. A clutch assembly comprising:
    a clutch hub rotatable about an axis, the clutch hub having an outer surface, an inner surface opposite the outer surface, and a hub friction surface that cooperates with the inner surface to at least partially define a cavity;
    a damper ring that is situated within the cavity, in contact with the hub friction surface, and rotatable with respect to the clutch hub about the axis;
    an apply member grounded to the hub and sufficiently configured and positioned to exert an axial force on the damper ring; and
    a plurality of clutch plates operatively connected to the hub for rotation therewith;
    wherein the hub defines a plurality of holes that extend between the inner surface and the outer surface;
    wherein the outer diameter of the damper ring and the inner surface define a flowpath therebetween; and
    wherein the clutch assembly is sufficiently configured such that the cavity is in fluid communication with a source of fluid lubricant such that lubricant flows between the hub friction surface and the damper ring to the lubricant flowpath and through the plurality of holes to lubricate the plurality of clutch plates.

* * * * *